United States Patent
Ahn et al.

(10) Patent No.: US 12,167,088 B2
(45) Date of Patent: Dec. 10, 2024

(54) METHOD AND APPARATUS FOR PROVIDING VIDEO STREAM BASED ON MACHINE LEARNING

(71) Applicant: Hyperconnect Inc., Seoul (KR)

(72) Inventors: Sang Il Ahn, Cheongju-si (KR); Yong Je Lee, Seoul (KR); Hyeon U Park, Seoul (KR); Beom Jun Shin, Seoul (KR); Gi Hoon Yeom, Seoul (KR)

(73) Assignee: Hyperconnect Inc., Seoul (KR)

( * ) Notice: Subject to any disclaimer, the term of this patent is extended or adjusted under 35 U.S.C. 154(b) by 0 days.

(21) Appl. No.: 17/651,203

(22) Filed: Feb. 15, 2022

(65) Prior Publication Data

US 2022/0303621 A1   Sep. 22, 2022

(30) Foreign Application Priority Data

Mar. 22, 2021 (KR) .......................... 10-2021-0036704

(51) Int. Cl.
*H04N 21/454* (2011.01)
*G06N 20/00* (2019.01)
(Continued)

(52) U.S. Cl.
CPC ........... *H04N 21/454* (2013.01); *G06N 20/00* (2019.01); *G06V 20/44* (2022.01); *H04N 21/441* (2013.01); *H04N 21/4662* (2013.01)

(58) Field of Classification Search
CPC ............... H04N 21/454; H04N 21/441; H04N 21/4662; G06N 20/00; G06V 20/44
See application file for complete search history.

(56) References Cited

U.S. PATENT DOCUMENTS 8,510,252 B1 *  8/2013  Gargi ..................... G06F 18/00
                                                        706/52
11,323,659 B2   5/2022  Ahn et al.
(Continued)

FOREIGN PATENT DOCUMENTS

KR         20110080224 A      7/2011
KR         20170000752 A      1/2017
(Continued)

OTHER PUBLICATIONS

Extended European Search Report for European Application No. 22162178.2, Search completed Jul. 19, 2022, Mailed Jul. 27, 2022, 8 Pgs.
(Continued)

*Primary Examiner* — Jefferey F Harold
*Assistant Examiner* — Franklin S Andramuno
(74) *Attorney, Agent, or Firm* — KPPB LLP

(57) ABSTRACT

A method of providing a video stream based on machine learning in an electronic device according to various example embodiments may include receiving a source video stream which is streamed from a first device to at least one other device, confirming whether an event is detected on the source video stream using a learning model trained through machine learning on the basis of at least one frame of the source video stream, and determining whether to restrict streaming of the source video stream from the first device on the basis of the event detection. In addition to the method, other example embodiments are possible.

10 Claims, 7 Drawing Sheets

(51) Int. Cl.
*G06V 20/40* (2022.01)
*H04N 21/441* (2011.01)
*H04N 21/466* (2011.01)

(56) References Cited

U.S. PATENT DOCUMENTS

| | | | |
|---|---|---|---|
| 11,430,238 B1* | 8/2022 | Blechschmidt | G06V 10/40 |
| 2015/0326630 A1* | 11/2015 | Kim | H04L 65/61 |
| | | | 709/231 |
| 2016/0379107 A1 | 12/2016 | Li et al. | |
| 2018/0181732 A1* | 6/2018 | Lim | H04L 63/0861 |
| 2019/0122258 A1 | 4/2019 | Bramberger et al. | |
| 2019/0253744 A1* | 8/2019 | Huang | H04N 21/251 |
| 2019/0373322 A1* | 12/2019 | Rojas-Echenique | G06N 3/045 |
| 2020/0137352 A1 | 4/2020 | Ahn et al. | |
| 2020/0154078 A1 | 5/2020 | Ahn et al. | |
| 2021/0232863 A1* | 7/2021 | Seo | G06N 3/084 |
| 2022/0124407 A1* | 4/2022 | Grover | H04N 7/147 |

FOREIGN PATENT DOCUMENTS

| | | | |
|---|---|---|---|
| KR | 20180116520 A | 10/2018 | |
| KR | 101932844 B1 | 12/2018 | |
| KR | 20190066218 A | 6/2019 | |
| KR | 102169073 B1 | 10/2020 | |
| KR | 102225100 B1 | 3/2021 | |
| WO | 2018221824 A1 | 12/2018 | |

OTHER PUBLICATIONS

Decision to Grant for Korean Patent Application No. 10-2021-0036704, Mailed Jul. 1, 2023, 7 pages.
Office Action for Korean Patent Application No. 10-2021-0036704, Mailed Apr. 5, 2023, 5 pages.

* cited by examiner

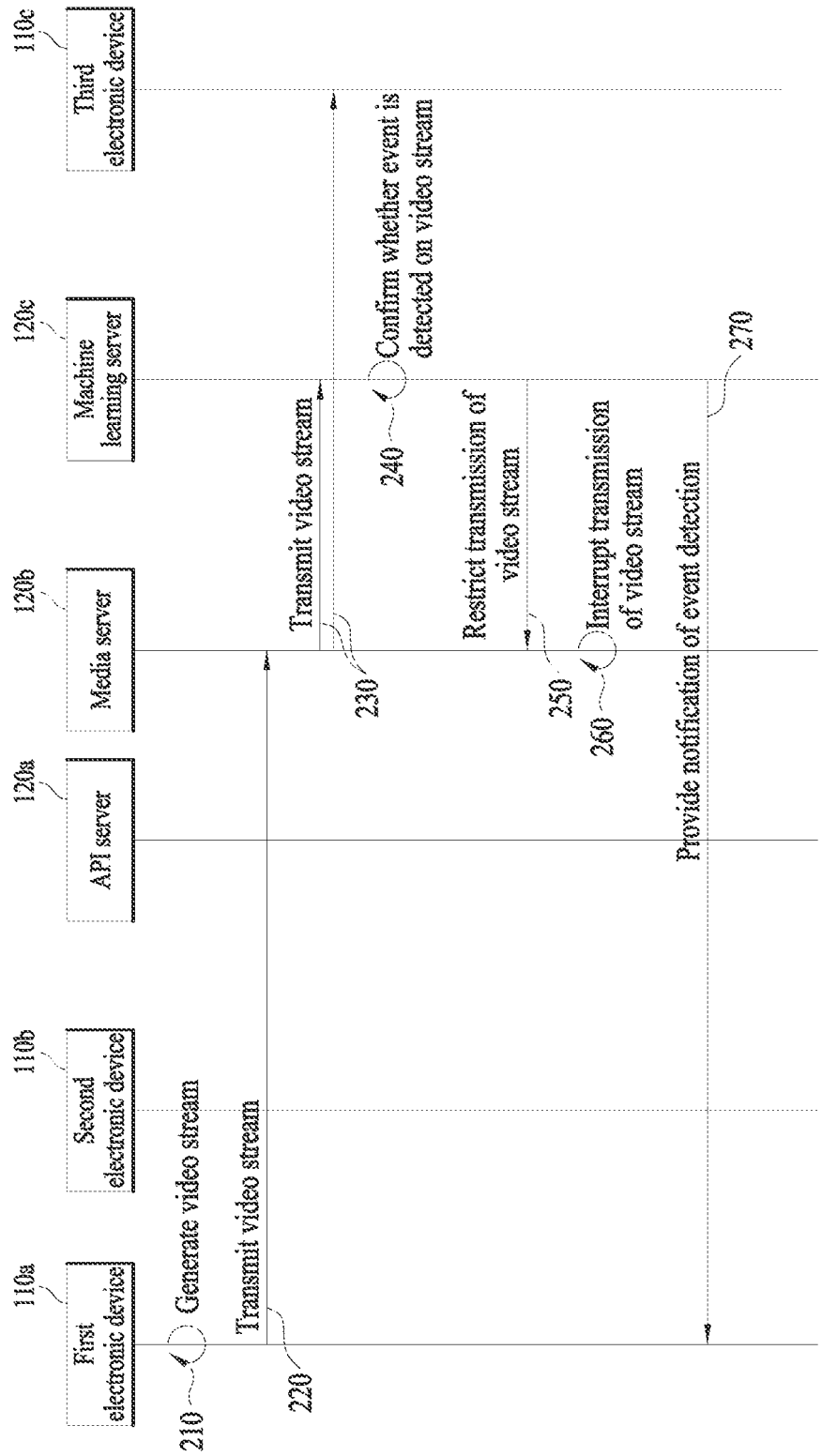

METHOD AND APPARATUS FOR PROVIDING VIDEO STREAM BASED ON MACHINE LEARNING

CROSS-REFERENCE TO RELATED APPLICATION(S)

This application claims the benefit of Korean Patent Application No. 10-2021-0036704, filed Mar. 22, 2021, in the Korean Intellectual Property Office, the disclosure of which is incorporated herein by reference.

BACKGROUND

1. Field of the Invention

The present disclosure relates to a method and an apparatus for providing a video stream based on machine learning.

2. Description of the Related Art

With the recent development of digital technology, various types of electronic devices such as mobile communication terminals, smart phones, tablet personal computers (PCs), laptops, and wearable devices have been widely distributed. In addition, with the rapid development of communication technologies such as the Internet, platforms which provide multi-party video call services or real-time personal broadcast services as one of various services using the electronic devices are becoming increasingly common.

In order to provide users with a wholesome service environment, an administrator is needed to monitor whether harmful elements are included in each video during the multi-party video call service or the real-time personal broadcast service and to impose sanctions on users who transmit inappropriate videos.

The related art is lacking in this aspect. When a report made on the user transmitting the inappropriate video in the video call or the personal broadcast is received, a method of passively imposing sanctions on the user on the basis of an accumulated number of reports is used.

SUMMARY

Users may feel displeased by being exposed to inappropriate videos in a real-time streaming session, and there may be cases in which the use of the service may be terminated without reporting the inappropriate videos such that it becomes necessary to consider a way to block occurrences of inappropriate videos in a more aggressive way. To this end, a method in which an administrator (for example, a monitoring agent) who participates in a video call or a personal broadcast and monitors the entire video one by one may be considered, but this method may be inefficient and difficult to apply in practice.

The matter to be achieved by the present example embodiments is to provide a method and an apparatus capable of automatically identifying whether harmful elements are included in a video stream transmitted in real time using at least one model (for example, a learning model trained through machine learning) and restricting transmission of a corresponding video stream.

The technical matters to be achieved by the present example embodiments are not limited to the technical matters described above, and various technical matters may be inferred from the following example embodiments.

According to one or more embodiments, a method of providing a video stream based on machine learning of an electronic device includes: receiving a source video stream which is streamed from a first device to at least one other device, confirming whether an event is detected on the source video stream using a learning model trained through machine learning on the basis of at least one frame of the source video stream, and determining whether to restrict streaming of the source video stream from the first device on the basis of the event detection.

In an embodiment, a method of providing a video stream based on machine learning of an electronic device includes: receiving a source video stream which is streamed from a first device to at least one other device, confirming whether an event is detected on the source video stream on the basis of at least one frame of the source video stream, and restricting streaming of the source video stream from the first device in response to the event detection.

In a further embodiment, an electronic device includes a communication module, a database, and a processor. The processor may be set to receive a source video stream which is streamed from a first device to at least one other, confirm whether an event is detected on the source video stream using a learning model trained through machine learning on the basis of at least one frame of the source video stream, and determine whether to restrict streaming of the source video stream from the first device on the basis of the event detection.

In another embodiment, an electronic device includes a communication module, a database, and a processor. The processor may be set to receive a source video stream which is streamed from a first device to at least one other, confirm whether an event is detected on the basis of at least one frame of the source video stream, and restrict streaming of the source video stream from the first device in response to the event detection.

In a further embodiment again, a computer-readable non-transitory recording medium for recording a program includes executing a method of providing a video stream based on machine learning on an electronic device. The method of providing a video stream based on machine learning may include receiving a source video stream which is streamed from a first device to at least one other device, confirming whether an event is detected on the source video stream using a learning model trained through machine learning on the basis of at least one frame of the source video stream, and determining whether to restrict streaming of the source video stream from the first device on the basis of the event detection.

In yet a further embodiment, a computer-readable non-transitory recording medium for recording a program includes executing a method of providing a video stream on an electronic device. A method of providing a video stream may include receiving a source video stream which is streamed from a first device to at least one other device, confirming whether an event is detected on the source video stream on the basis of at least one frame of the source video stream, and restricting streaming of the source video stream from the first device in response to the event detection.

The details of other example embodiments are included in the detailed description and the accompanying drawings.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 2 is a schematic flowchart illustrating a method of providing a video stream according to various example embodiments of the present disclosure;

DETAILED DESCRIPTION

Figure 1A:
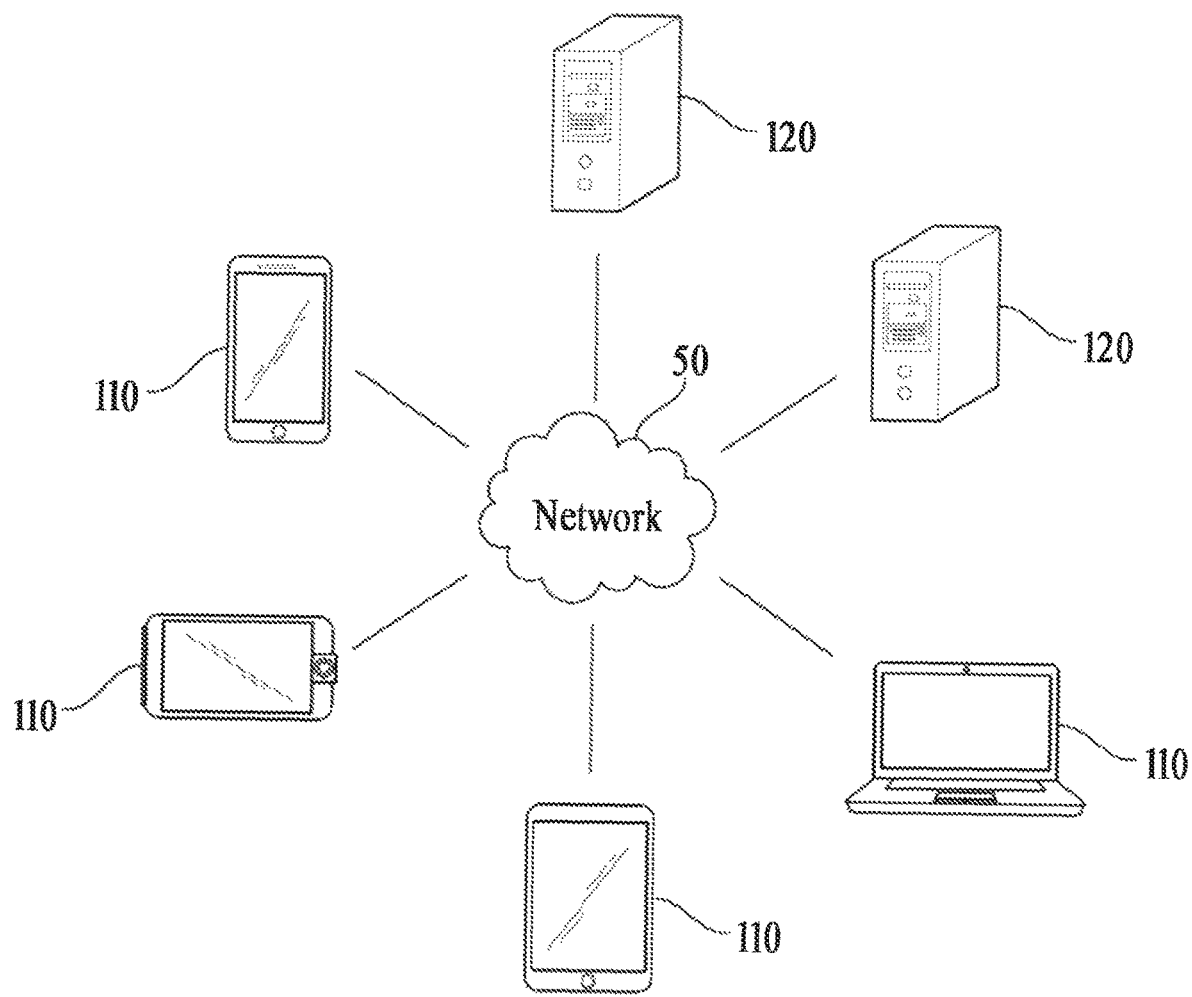
FIG. 1A is a diagram illustrating a network environment according to various example embodiments of the present disclosure.

The terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it is to be noted that the terms used herein are to be construed based on practical meanings thereof and the whole content of this specification, rather than being simply construed based on names of the terms.

When a component is referred to as "being included" in a portion, this refers to that other component may be further included rather than not included in the portion unless the context clearly describes otherwise.

The expression "at least one of A, B, and C" may include the following meanings: A alone; B alone; C alone; both A and B together; both A and C together; both B and C together; and all three of A, B, and C together.

An "electronic device" referred to below may be implemented as a computer or a portable terminal capable of accessing a server or other electronic device through a network. Here, the computer includes, for example, a desktop, and a laptop, which are equipped with a web browser; and the portable terminal includes, for example, a wireless communication device which ensures portability and mobility, and may include all types of handheld-based wireless communication devices including terminals based on communication, such as international mobile telecommunication (IMT), code division multiple access (CDMA), w-code division multiple access (W-CDMA), long term evolution (LTE), smartphones, and tablet personal computers (PCs).

Streaming described herein may correspond to a concept classified into commercial and consumer models as a service provided to produce and transmit a video in real time or to watch such a video.

Example embodiments of the present disclosure will be fully described in detail below which is suitable for implementation by those skilled in the art with reference to the accompanying drawings. However, the present disclosure may be implemented in various different forms, and thus it is not limited to embodiments to be described herein.

Hereinafter, embodiments of the present disclosure will be described in detail with reference to the accompanying drawings.

In describing the example embodiments, descriptions of technical contents that are well known in the technical field to which the present disclosure pertains and are not directly related to the present disclosure will be omitted. This is to more clearly convey the gist of the present disclosure without obscuring the gist of the present disclosure by omitting unnecessary description.

For the same reason, some components are exaggerated, omitted, or schematically illustrated in the accompanying drawings. In addition, the size of each component does not fully reflect the actual size. In each drawing, the same or corresponding elements are assigned the same reference numerals.

The advantages and features of the present disclosure and the manner of achieving the advantages and features will become apparent with reference to the embodiments described in detail below with the accompanying drawings. The present disclosure may, however, be implemented in many different forms and is not to be construed as being limited to the embodiments set forth herein, and the embodiments are provided such that this disclosure will be thorough and complete and will fully convey the scope of the present disclosure to those skilled in the art, and the present disclosure is defined by merely the scope of the appended claims. The same reference numerals refer to the same components throughout this disclosure.

In this case, it will be understood that each block of flowchart diagrams and combinations of the flowchart diagrams may be performed by computer program instructions. These computer program instructions may be embodied in a processor of a general purpose computer, a special purpose computer, or other programmable data processing equipment such that the instructions performed by the processor of the computer or other programmable data processing equipment generate parts for performing functions described in flowchart block(s). These computer program instructions may use a computer or other programmable data processing equipment for implementing a function in a specific manner or may be stored in a computer readable memory, and thus the instructions which use the computer or are stored in the computer readable memory can produce a manufacturing article including instruction parts for performing the functions described in the flowchart block(s). Since the computer program instructions can also be embedded in the computer or other programmable data processing equipment, these instructions can provide operations for performing the functions described in the flowchart block(s), as they are a series of operations that are performed on the computer or other programmable data processing equipment to generate a computer-executed process, thereby operating the computer or other programmable data processing equipment.

In addition, each block may represent a module, segment, or a portion of a code, which includes one or more executable instructions for executing specified logical function(s).

It is also to be noted that, in some alternative embodiments, it is also possible for the functions mentioned in the blocks to occur out of the order. For example, two blocks shown in succession can be substantially performed simultaneously or, in sometimes, the two blocks can be performed in the reverse order according to corresponding functions.

FIG. 1A is a diagram illustrating a network environment according to various example embodiments of the present disclosure.

Referring to FIG. 1A, a network environment 1 according to an example embodiment of the present disclosure may include at least one electronic device 110, at least one server 120, and a network 50. In FIG. 1A, four electronic devices 110 and two servers 120 are illustrated as an example of the network environment 1, and the network environment 1 according to various example embodiments of the present disclosure is not limited to the number of the electronic devices 110 or the number of the server 120 and may include various types of network environments to which the following example embodiments may be applied.

The electronic device 110 may include a fixed terminal or a mobile terminal implemented as a computer device. In many embodiments, the electronic device 110 may include at least one among a smartphone, a mobile phone, a navigation device, a computer, a notebook, a digital broadcast terminal, a personal digital assistant (PDA), a portable multimedia player (PMP), a tablet PC, and a wearable device. Illustratively, although a specific electronic device 110 is shown in the form of a smartphone in FIG. 1A, this may correspond to a variety of physical computer devices capable of actually communicating with another electronic device 110 and/or the server 120 using a wireless or wired communication method through the network 50.

Meanwhile, according to various example embodiments of the present disclosure, at least one of the electronic devices 110 may correspond to a video provider device (for example, a host device or a guest device) which generates a video stream and transmits the video stream to a server (for example, a media server) or another electronic device (for example, a video viewer device) in a streaming transmission method. Alternatively, at least one other of the electronic devices 110 may correspond to a video viewer device which receives a video stream generated by the video provider device and outputs the video stream through a display and/or a speaker. According to another example embodiment, the electronic device 110 may be a device corresponding to a monitoring agent which monitors occurrence of an event regarding whether a harmful element is included in a video stream generated by a specific video provider device.

The network 50 may facilitate connections between the electronic device 110 and the server 120; the electronic device 110 and another electronic device 110; or the server 120 and another server 120. In many embodiments, the network 50 may provide an access path such that each device may be connected to each other to transmit/receive packet data. In many embodiments, the network 50 may be implemented in a communication method using communication networks (for example, a mobile communication network, a wired Internet, a wireless Internet, and a broadcast network) and in various short-range wireless communication methods. For example, the network 50 may include at least one among networks such as a personal area network (PAN), a local area network (LAN), a campus area network (CAN), a metropolitan area network (MAN), a wide area network (WAN), a broadband network (BBN), and the Internet. In several embodiments, network 50 may be implemented as at least one network topologies including but not limited to a bus network, a star network, a ring network, a mesh network, a star-bus network, and a tree or hierarchical network.

The server 120 may include a plurality of computer systems implemented as a network server or computer software and may configure and provide various pieces of information in the form of a web page. In certain embodiments, the user device 120 may refer to a computer system and computer software which is connected to a sub-device capable of communicating with another network server through a computer network such as the Intranet or the Internet to receive a request for performing a task, perform the task, and provide an execution result. In addition to the above description, the server 120 may be understood as a broad concept including a series of application programs capable of being operated on a network server and various databases built in the network server. In selected embodiments, the electronic device 100 may be implemented using network server programs which are variously provided according to an operating system (OS) such as a disk OS (DOS), Windows, Linux, universal network information exchange (UNIX), or a Macintosh (Mac) OS. In many embodiments, the server 120 may be implemented as a computer device (or a plurality of computer devices) which communicates with another electronic device 110 or another server 120 through the network 50 and transmits and receives various pieces of information such as commands, codes, files, or contents.

The server 120 according to various example embodiments may include a media server which receives a video generated from a specific video provider device (for example, a host device or a guest device) in a streaming method and transmits the received video stream to a plurality of other electronic devices (for example, video viewer devices) in the streaming method. In selected embodiments, the media server may store the received video stream in a queue and sequentially transmit the received video stream to a plurality of electronic devices in the streaming method.

As another example, the server 120 may include a machine learning server corresponding to any one among the plurality of electronic devices which receive a video stream from the media server. The machine learning server may include at least one learning model trained through machine learning and confirm whether an event is detected for a video stream using the learning model. In several embodiments, when it is determined that an event is detected in a specific video stream using the above-described learning model, the machine learning server may restrict streaming transmission from the video provider device which provides the video stream or transmit information related to the event detection to a device corresponding to the monitoring agent through an application programming interface (API) server, thereby reconfirming whether the event is detected.

In many embodiments, the API server may provide the information related to the event detection received from the machine learning server to a specific electronic device 110 corresponding to the monitoring agent (administrator), and the monitoring agent may electively restrict streaming transmission by the electronic device correspond to the video provider on the basis of the received information.

Figure 1B:
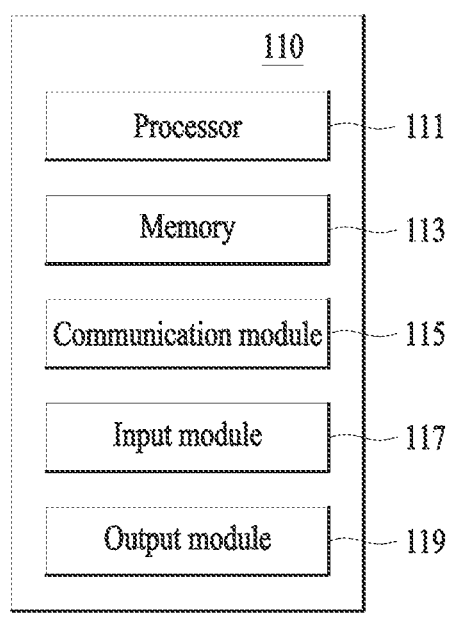
FIG. 1B is a block diagram illustrating a configuration of an electronic device according to various example embodiments of the present disclosure.

FIG. 1B is a block diagram illustrating a configuration of an electronic device according to various example embodiments of the present disclosure.

As described above, the electronic device 110 according to various example embodiments is a user device using a real-time personal broadcast service (or a multi-party video call service) and may correspond to any one of a video provider device which provides a video or a video viewer device which receives and outputs the video. On the other hand, in response to whether a user using the electronic device determines to supply a video or to watch a video produced by another device, the electronic device may be a video provider device or a video viewer device according to circumstances. In addition, the electronic device 110 according to various example embodiments is a device corresponding to a monitoring agent which manages occurrence of an event related to video content (for example, a video stream) generated by a specific video provider device and may correspond to a monitoring agent device.

Hereinafter, referring to FIG. 1B, the electronic device 110 (for example, the video provider device, the video viewer device, or the monitoring agent device) may include at least one among a processor 111, a memory 113, a communication module 115, an input module 117, and an output module 119.

In certain embodiments, the processor 111 of the electronic device 110 may generate video content using a camera and/or a microphone included in the input module 117. Processor 111 may transmit the generated video content or receive specific information (or a content) from another device using the communication module 115. In addition, the processor 111 may output a specific video content using a display and/or a speaker included in the output module 119 and store or withdraw a series of commands or predetermined data related to an operation of the electronic device 110 through the memory 113.

FIG. 1B is a block diagram illustrating a configuration of a server according to various example embodiments of the present disclosure.

Figure 1C:
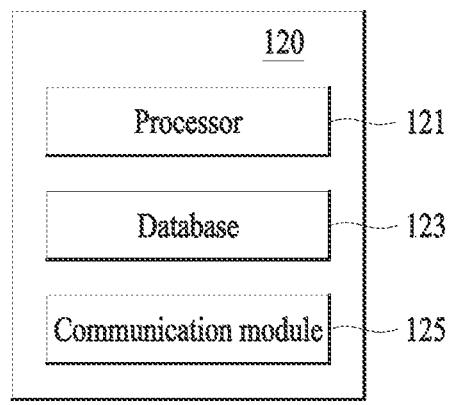
FIG. 1C is a block diagram illustrating a configuration of a server according to various example embodiments of the present disclosure.

Referring to FIG. 1C, the server 120 (for example, the media server, the machine learning server, or the API server) may include at least one among a processor 121, a database 123, and a communication module 125.

In many embodiments, the processor 121 of the server 120 may transmit a predetermined video content (for example, a video stream) received from a specific device to another device using the communication module 125 or may detect a specific event on the basis of the received video. The processor 121 may maintain or restrict transmission of the video content on the basis of the detection of the event and may provide evaluation information on a specific device (for example, the video provider device), for example, registers as an abusive user. In several embodiments, the processor 121 may confirm whether the event is detected for the predetermined video content (for example, the video stream) using at least one model (for example, at least one learning model trained through machine learning) pre-stored in the database 123, and when an event is detected for a specific video content, the processor 121 may transmit the detected information related to the event to another device (for example, the monitoring agent device).

The processor 121 may perform a series of operations for processing various functions implemented in the server 120. In selected embodiments, the processor 121 may receive learning data (for example, video content information confirmed as corresponding to the event) and train the learning model using the learning data through machine learning.

The database 123 is a data structure implemented in a predetermined storage space of the server 120 and may have fields or components for processing functions such as storage, search, deletion, editing, or addition of data. For example, the database 123 may be electrically connected to the processor 121 and store commands related to the operations of the processor 121. In addition, the database 123 may store various pieces of data used in the server 120 (for example, learning data, commands for machine learning, critical condition information related to a probability value, and information related to a frame sampling condition).

Figure 3:
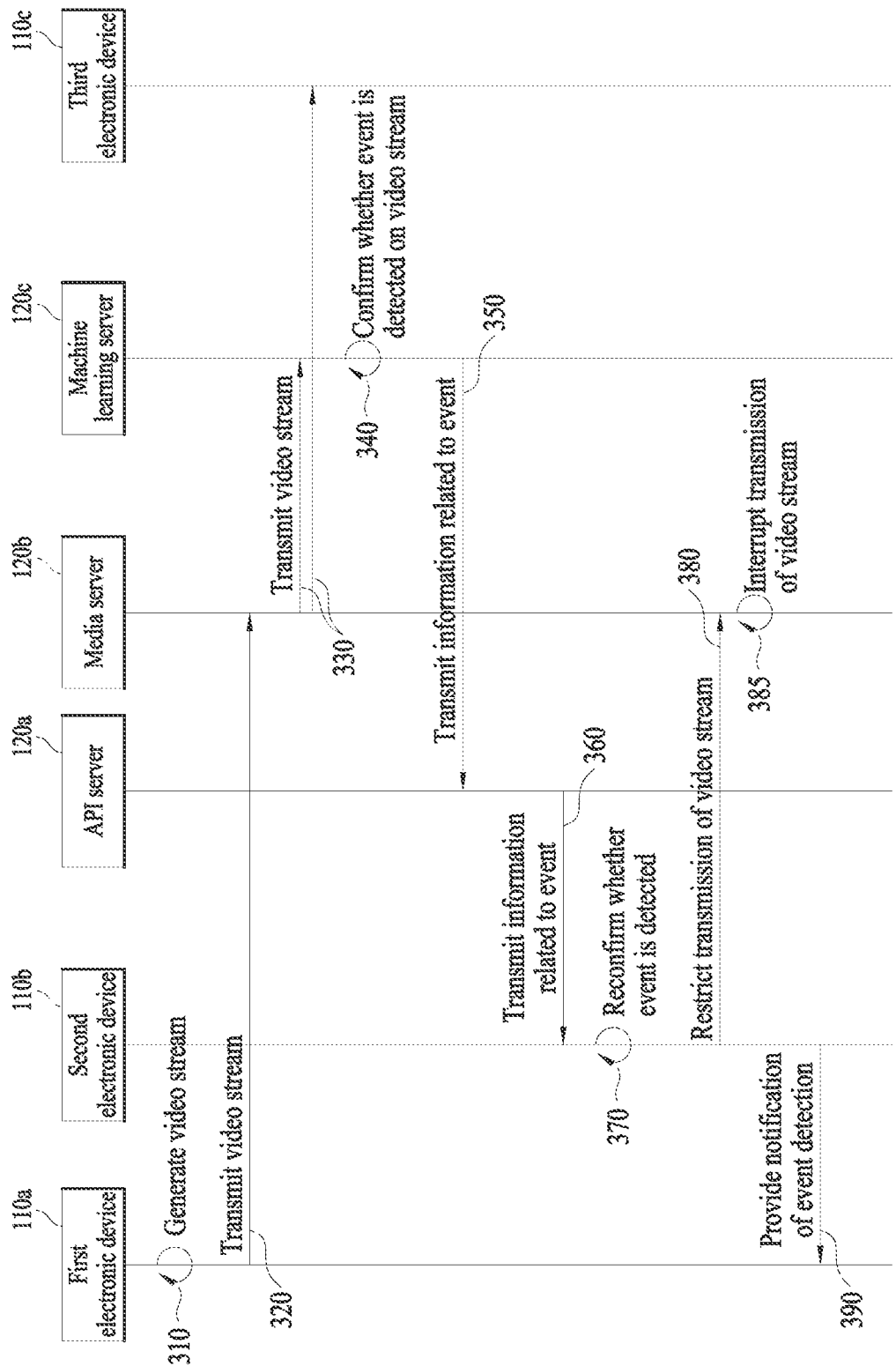
FIG. 3 is a schematic flowchart illustrating a method of providing a video stream according to various example embodiments of the present disclosure where a second electronic device is utilized to confirm inappropriate videos are detected on the video stream.

FIGS. 2 and 3 are schematic flowcharts illustrating a method of providing a video stream according to various example embodiments of the present disclosure.

Referring to FIG. 2, in operation 210 of the method of providing a video stream according to various example embodiments, a video stream may be generated by a first electronic device 110a (for example, a video provider device) first.

In many embodiments, a video provider corresponding to the first electronic device 110a may correspond to a user who intends to provide a video stream using a real-time personal broadcast service (or a multi-party video call service). In certain embodiments, the video provider may generate a predetermined video stream (or video contents) using predetermined input modules (for example, a camera and a microphone) included in the first electronic device 110a. Image data and/or audio data may be included in the video stream.

Next, in operation 220, the first electronic device 110a may transmit the generated video stream to a media server 120b in a real-time streaming method. In addition, in operation 230, the media server 120b may transmit the received video stream a plurality of other devices (for example, video viewer devices) again. As described above, the media server 120b may serve to relay the video stream between the video provider device and the video viewer device. Meanwhile, in an example embodiment, since the video stream generated by the first electronic device 110a is streamed to other devices, the video stream may be referred to as a source stream.

Meanwhile, the plurality of other devices receiving the video stream from the media server 120b may each include a third electronic device(s) 110c (for example, the video viewer device) and a machine learning server 120c.

In selected embodiments, a video viewer corresponding to the third electronic device 110c may correspond to a user who is provided with a predetermined video stream using a real-time personal broadcast service (or a multi-party video call service). The video viewer may confirm (view) a video output in real time using output modules (for example, a display and a speaker) provided in the third electronic device 110c. Meanwhile, the third electronic device 110c may refer to a plurality of video viewer devices corresponding to a plurality of video viewers viewing the video stream received from the media server 120b.

The machine learning server 120c may correspond to a monitoring device prepared to detect a situation (event) in which an inappropriate video is provided to the third electronic device 110c (that is, the video viewer device) within a short time and act on the detected situation (event). The machine learning server 120c may receive a video stream in real time from at least one video provider (for example, the first electronic device 110a such as a host or a guest) which generates the video stream by participating in the real-time personal broadcast service (or the multi-party video call service) and confirm whether an event is detected for the video stream in real time.

Meanwhile, in an example embodiment, the media server 120b may store (keep) the video stream received from the first electronic device 110a in a queue first and provide the video stream to the plurality of other devices in a streaming method according to a predetermined processing method.

In operation 240, the machine learning server 120c may confirm whether an event is detected for the video stream received through the media server 120b.

The machine learning server 120c may store at least one learning model trained through machine learning in advance in a database and confirm in real time whether a specified event occurs in the video stream transmitted in real time using the learning model.

In selected embodiments, the learning model trained through the machine learning may include a neural network having two or more layers. In many embodiments, the learning model trained through the machine learning may include an input layer, an output layer, and at least one hidden layer. The learning model may include a classification model which is previously trained using training data obtained by classifying at least one piece of video data and/or at least one piece of audio data into a normal element and an abnormal element (for example, a harmful element).

In certain embodiments, the learning model may extract predetermined features from arbitrary video data and/or arbitrary audio data and use the extracted features as input data, thereby confirming whether an abnormal element (for example, a harmful element) is included in the video data and/or the voice data (that is, whether an event is detected).

Meanwhile, in relation to output data for indicating that an abnormal element is included or not included in the video data and/or the audio data (for example, classification information related to whether the event is detected), the learning model may further provide a probability value related to reliability of the output data.

According to an example embodiment, when the output data is provided as having a probability value that is greater than or equal to a specified threshold value, the machine learning server 120c may directly reflect a monitoring result on the video stream in a method of restricting video streaming transmission from the first electronic device 110a on the basis of the output data.

In addition, when the probability value is smaller than the specified threshold value, the machine learning server 120c may ignore the output data or transmit a reconfirmation request for the event detection to another device (for example, the second electronic device 110b).

Alternatively, in another example embodiment, the threshold value may include a first threshold value and a second threshold value. In many embodiments, when the second threshold value is greater than the first threshold value and the probability value is greater than or equal to the first threshold value and is less than the second threshold value, the machine learning server 120c may request the second electronic device 110b to reconfirm the event detection and restrict streaming on the basis of a response of the second electronic device 110b. In addition, when the probability value is equal to or greater than the second threshold, the machine learning server 120c may directly restrict the streaming in response to acquisition of the probability value.

According to an example embodiment, when the probability value is greater than or equal to a predetermined threshold value (for example, the second threshold value), the machine learning server 120c may interrupt a confirmation operation whether an event is included in the video stream from the first electronic device 110a for a specified time (for example, twenty-four hours). In several embodiments, the machine learning server 120c may determine a user corresponding to the first electronic device 110a as an abusive user and may omit a confirmation operation on whether an event is detected on the video stream provided from the first electronic device 110a. In certain embodiments, on the basis of user identification information which is confirmed when the event is detected, the machine learning server 120c may restrict streaming transmission of the video stream generated by the user corresponding to the first electronic device 110a for a specified time regardless of identification information on a broadcast through which the video stream is streamed. Next, in operation 250, when a predetermined event is detected in operation 240, the machine learning server 120c may transmit information related to the event, which includes a command for restricting transmission of the video stream, to the media server 120b.

As the media server 120b receives the information related to the event (for example, the command for restricting transmission of the video stream) from the machine learning server 120c, in operation 260, the media server 120b may interrupt streaming transmission of the video stream corresponding to the event to the third electronic device 110c. In addition, although not shown in the drawings, the media server 120b according to an example embodiment may transmit information for notifying that provision of the video stream from the first electronic device 110a is interrupted to the third electronic device 110c. Meanwhile, in an example embodiment, a stream streamed to the third electronic device 110c may be referred to as a target stream, and the target stream may include a video corresponding to at least one source stream. In many embodiments, one stream may be generated by merging several source streams, and thus a plurality of users may perform a broadcast through one stream. In the example embodiment, in such a case, provision of at least a portion of the video stream may be interrupted in a method of restricting transmission of a portion corresponding to the source stream in which the event is detected of the target stream. In addition, when the event is detected in some streams of the broadcast including a plurality of source streams, in order to improve user experience, it is possible to more frequently determine whether the event is detected on the source stream included in the target stream and/or to perform more strictly event determination by changing a threshold value setting for event determination.

Meanwhile, in operation 270, the machine learning server 120c may provide at least one of notification information for indicating that the event is detected from the video stream and notification information for indicating that streaming of the video stream is restricted to the first electronic device 110a which generates the video stream corresponding to the detected event. As another example, unlike the part as shown in FIG. 2, the media server 120b confirming the event detection of the video stream from the machine learning server 120c may transmit event detection notification information and/or notification information for indicating that streaming of the video stream is restricted to the first electronic device 110a, on behalf of the machine learning server 120c.

In addition, any one among the machine learning server 120c, the media server 120b, the API server 120a may manage an event detection history of the user by registering the user (for example, the video provider) corresponding to the first electronic device 110a, which generates the video stream corresponding to the detected event, as an abusive user.

As described above, the method of providing a video stream according to an example embodiment described with reference to FIG. 2 may correspond to a method, when the predetermined event is detected from the specific video stream in the machine learning server 120c, which is applied merely when the probability value related to the event detection provided as a reliability index of the event detection is greater than or equal to a specified threshold value. Meanwhile, when the probability value related to the event detection is smaller than the specified threshold value, a method of providing a video stream according to an example embodiment described below with reference to FIG. 3 may be applied.

When the probability value related to the event detection is greater than or equal to the specified threshold value, the method of providing a video stream according to another example embodiment may provide a video stream according to each operation shown in FIG. 2, and when the probability value related to the event detection is less than the specified threshold value, the method of providing a video stream may ignore an event detection result (that is, the output data) or provide report suggestion information related to the event detection to the video viewer device (for example, the third electronic device 110c).

A method of providing a video stream according to still another example embodiment may provide a video stream according to each operation shown in FIG. 3 at any time, regardless of whether the probability value related to the event detection is smaller than the specified threshold value.

Referring to FIG. 3, in the method of providing a video stream according to various example embodiments, a video stream generated by the first electronic device 110a in operation 310 may be transmitted to the media server 120b in operation 320, and the video stream may be transmitted from the media server 120b to a plurality of other devices (for example, the machine learning server 120c and the third electronic device 110c) in operation 330.

In addition, in operation 340, the machine learning server 120c may confirm whether an event is detected in the received video stream using a learning model trained through machine learning. The above-described operations 310 to 340 may correspond to substantially the same operations as operations 210 to 240 described with reference to FIG. 2.

Meanwhile, when it is confirmed that the event is detected in the received video stream by the machine learning server 120c in operation 340, the machine learning server 120c may then transmit information related to the detected event to the API server 120a in operation 350.

As described above, when the detection of the event is confirmed in operation 340, the machine learning server 120c according to an example embodiment performs the following operations on the basis of whether the probability value related to the detection of the event is smaller than a specified threshold value. In certain embodiments, merely when the probability value related to the event detection is less than the specified threshold value, in operation 350, the machine learning server 120c may transmit information related to the video stream corresponding to the detected event, that is, event related information, to the API server 120a. In addition, in operation 360, the API server 120a may transmit the event related information to the second electronic device 110b.

In many embodiments, the second electronic device 110 is an electronic device corresponding to the monitoring agent (for example, an administrator) may receive predetermined information for reconfirming whether the event is detected on a specific video stream, which is primarily confirmed by the machine learning server 120c.

Meanwhile, according to an example embodiment, the second electronic device 110b to which the API server 120a transmits the event related information in operation 360 may refer to one or more external devices. In several embodiments, the API server 120a (or the machine learning server 120c) may determine the number of external devices, to which the event related information is to be transmitted, on the basis of a magnitude of the probability value. In certain embodiments, when the probability value related to the event detection is greater than or equal to a first threshold and is less than a second threshold, the API server 120a may transmit the event related information to a single external device (for example, a first external device). In selected embodiments, when the probability value related to the event detection is less than the first threshold, the API server 120a may transmit the event related information to two or more external devices (for example, the first external device and a second external device). In many embodiments, the first external device and the second external device may correspond to electronic devices corresponding to different monitoring agents, respectively.

That is, the API server 120a (or machine learning server 120c) may reconfirm whether the event is detected through an external device(s) on the basis that the event related probability value is smaller than a set magnitude and may set the number of times of reconfirmation (or re-censorship) to two or more times on the basis of the magnitude of the probability value.

In addition, although not shown in the drawing, according to an example embodiment, the machine learning server 120c may additionally train the learning model on the basis of reconfirmation result information on whether the event is detected, which is received from the second electronic device 110b (for example, at least one of the first external device and the second external device). According to an example embodiment, the information related to the event detection, which is transmitted in operation 350 and 360, may include at least one among time stamp information corresponding to a point of time when the event occurs in the video stream in relation to the video stream in which the event is detected, frame information corresponding to a portion of the video stream in which the event is identified, user (for example, the video provider) identification (ID) information corresponding to the first electronic device 110a which generates the video stream, and broadcast identification (ID) information related to the video stream (for example, a stream ID or a broadcast ID). In addition, in an example embodiment, when a specific frame related to the event detection (for example, first frame information) is identified, both of information on at least one previous frame (for example, second frame information) and information on at least one subsequent frame (for example, third frame information) of the specific frame are transmitted to the second electronic device 110b, and the second electronic device 110b may assist with confirming a context of the specific frame on the basis of the pieces of transmitted information.

For example, in a real-time personal broadcast service (or a multi-party video call service) according to an example embodiment of the present disclosure, a plurality of video streams generated from two or more first electronic devices 110a (for example, video provider devices) in one broadcast may be simultaneously provided through partial regions allocated in one screen.

In several embodiments, a video provider, which newly generates a specific broadcast and provides a video stream through the generated broadcast, may correspond to a host, and another video provider, which provides a video stream by participating in the already generated broadcast, may correspond to a guest.

In certain embodiments, as a new broadcast is generated by a device (a host device) corresponding to a specific host, an administrator device (for example, the API server 120a or the media server 120b), which provides the real-time personal broadcast service, may assign broadcast ID information (broadcast ID) corresponding to the new broadcast. In addition, the administrator device may assign stream ID information (stream ID) corresponding to the video stream with respect to the video stream provided from the device corresponding to the host device. On the other hand, even when a specific video provider wants to provide a video stream by participating in a previously generated broadcast as a guest, the administrator device may assign stream ID information (stream ID) with respect to a video stream provided from a device corresponding to the guest.

In various example embodiments of the present disclosure, the first electronic device 110a may correspond to at least one of the host device or the guest device.

Referring to operations 350 and 360 again, when an event for a specific video stream is detected, the machine learning server 120c may confirm at least one of stream ID information (stream ID) corresponding to the specific video stream and broadcast ID information (broadcast ID) of a broadcast to which the specific video stream is provided. In certain embodiments, the pieces of information may be received from the media server 120b at a point of time when streaming transmission of the video stream is started from the media server 120b in operation 330.

According to an example embodiment, in operation 350, the machine learning server 120c may provide the API server 120a with the stream ID information (stream ID) of the video stream corresponding to the identified event, and in operation 360, the API server 120a may provide the second electronic device 110b with the stream ID information (stream ID) and the broadcast ID information (broadcast ID). In many embodiments, the API server 120a may confirm the broadcast ID information (broadcast ID) corresponding to the stream ID information (stream ID) on the basis of the received stream ID information (stream ID) and may transmit the confirmed broadcast ID information (broadcast ID) together with the stream ID information (stream ID) to the second electronic device 110b.

On the other hand, unlike as shown in FIG. 3, in the method of providing of a video stream according to an example embodiment, instead of the event related information being transmitted from the machine learning server 120c to the API server 120a in operation 350 and then the API server 120a transmitting the event related information again to the second electronic device 110b in operation 360, the machine learning server 120c may directly transmit the event related information to the second electronic device 110b.

In addition, in a method of providing a video stream according to another example embodiment, when the machine learning server 120c transmits the information related to the event detection to the media server 120b, the media server 120b may provide the information related to the event detection to the API server 120a (or the second electronic device 110b).

Referring to FIG. 3 again, in operation 370, the second electronic device 110b (for example, the monitoring agent device) may output content data of at least a portion of a video stream corresponding to the event confirmed by the machine learning server 120c on the basis of the received event related information and receive an input from the user (for example, the monitoring agent (administrator)) to reconfirm whether the event is detected in the video stream.

In operation 370, when the detection of the event in the video stream is reconfirmed on the basis of the user input, the second electronic device 110b may transmit the event related information including a command to restrict streaming transmission of the video stream to the media server 120b in operation 380, and in operation 385, the media server 120b may interrupt transmission of the video stream.

In addition, in operation 390, in response to the reconfirmation of the detection of the event in the video stream, the second electronic device 110b according to an example embodiment may also provide notification information on the event detection and the transmission restriction of the video stream to the first electronic device 110a.

In addition, the second electronic device 110b according to an example embodiment may manage an event detection history of the user in a method of registering the user (for example, the video provider) corresponding to the first electronic device 110a as an abusive user.

In addition, although not shown in FIG. 3, when the detection of the event in the video stream is reconfirmed, the second electronic device 110b according to an example embodiment may provide data related to the confirmation result to the machine learning server 120c as additional learning data, and the machine learning server 120c may perform machine training on the learning model on the basis of the additional learning data.

Figure 4:
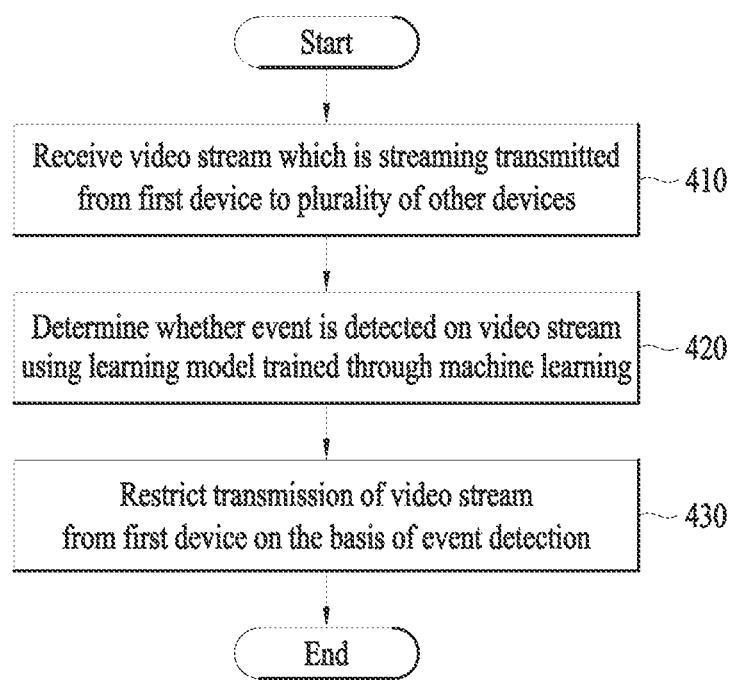
FIG. 4 is a flowchart illustrating a method of providing a video stream based on machine learning of an apparatus according to an example embodiment of the present disclosure.

FIG. 4 is a flowchart illustrating a method of providing a video stream based on machine learning of an apparatus (for example, the machine learning server 120c of FIG. 2) according to an example embodiment of the present disclosure.

Referring to FIG. 4, in operation 410, a device according to various example embodiments may receive a video stream which is generated from a first device (for example, the first electronic device 110a of FIG. 2) to be transmitted to a plurality of other devices (for example, the third electronic device 110c of FIG. 2).

In selected embodiments, the first device may correspond to a video provider device which generates and transmits a video stream, and the plurality of other devices may at least include a device corresponding to a video viewer device which receives the video stream in a streaming method.

Meanwhile, in operation 410, the device according to an example embodiment may directly receive the video stream, which is generated by the first device, from the first device or indirectly receive the video stream through an intermediate device (for example, the media server 120b of FIG. 2) which receives the video stream and then transmits the video stream to the device and the plurality of other devices.

In operation 420, the device may determine whether a predetermined event is detected in the video stream received in real time in operation 410 using at least one learning model trained through machine learning.

According to various example embodiments, the event may be about whether a video (for example, image data and/or audio data) corresponding to at least one among an abusive gesture, an insult gesture, a racist gesture, a sexual content, nudity, genitalia, sexual activity, unsanitary contents, excrement, defecation, antisocial contents, anti-human contents, other illegal activity, criminal activity, violent activity, abusive activity, self-harm, weapons, drugs, antisocial symbols, hateful contents, threatening content, phobia-inducing contents, and blood is included. The device according to an example embodiment may pre-train the learning model using learning data obtained by classifying the event into a plurality of event types and may be implemented in a method of confirming whether a specific video corresponds to at least one among the plurality of divided event types.

Meanwhile, according to various example embodiments, the learning model may be trained using a deep learning algorithm. In many embodiments, the learning model may be trained using an algorithm including at least one among a deep neural network (DNN), a convolutional neural network (CNN), a recurrent neural network (RNN), a region-based convolutional neural network (R-CNN), a deep belief network (DBN), a deep quantum (Q)-network.

Meanwhile, in the present specification, although it has been described that the event is detected using the learning model trained through the machine learning, the device according to various example embodiments may provide the video stream or restrict streaming of the video stream using various types of logic models. For example, the device according to various example embodiments may be implemented through a model in which at least some of the various operations described as being performed using a machine learning model in the present specification is consisting of a predetermined decision tree.

Meanwhile, in operation 420, in order to efficiently process the event detection, the device according to various example embodiments may sample at least some of frames from the video stream received from the first device according to a specified condition and may confirm whether an event is detected on the basis of the at least sampled data (for example, the at least some frames).

Figure 5:
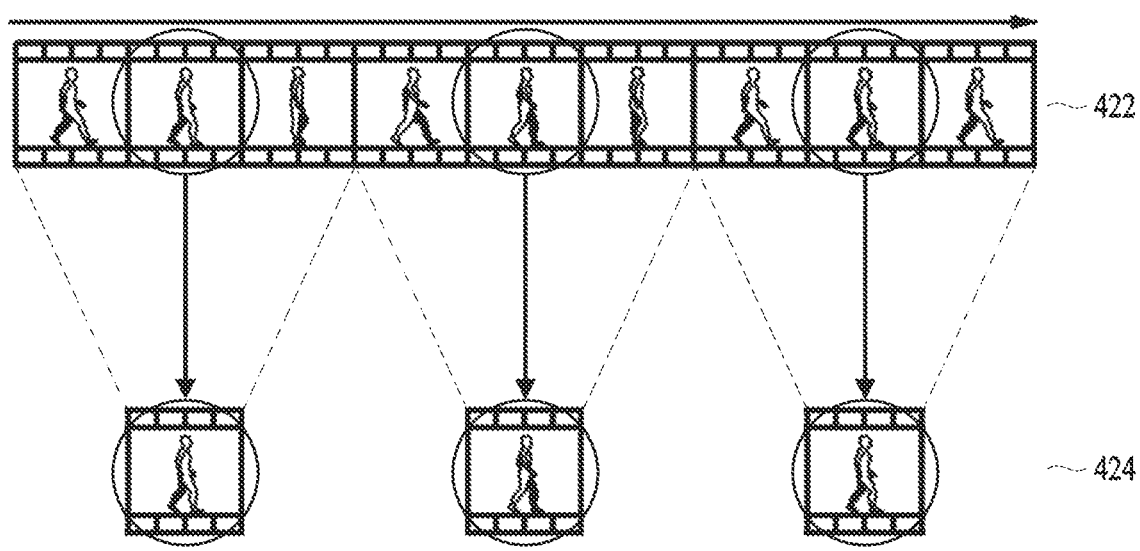
FIG. 5 is a diagram for describing a method of sampling a video stream according to an example embodiment of the present disclosure.

FIG. 5 is a diagram for describing a method of sampling a video stream according to an example embodiment of the present disclosure.

Referring to FIG. 5, the device may sample some frames 424 among frames 422 included in a received video stream according to a specified condition. In certain embodiments, the device may acquire the sampled frames 424 by extracting at least some of the frames 422 included in the video stream at every unit of a specified time or by extracting at least some of the frames 422 at every unit of specified number of frames.

According to various example embodiments, the device may adjust a computational load of the device or selectively adjust accuracy of event detection by controlling the sampling condition.

In many embodiments, the device according to an example embodiment may control the sampling condition on the basis of user ID information corresponding to the first device (for example, the video provider device) which provides the video stream. Depending on the existing event occurrence history (or a cumulative punishment history and a cumulative report history) of a specific video provider (for example, a host or a guest), when a video stream provided by the video provider satisfies a predetermined criterion in which a probability of event detection is high, the device may be set to sample a frame at a relatively short time period or at a period of a small number of frames with respect to the video stream provided from the first device corresponding to the video provider. In contrast, when an event occurrence history in the video stream provided from the video provider is not present or is significantly less despite the fact that a certain video provider has a large number of broadcast histories, frames of a video stream provided from the first device corresponding to the video provider may be set to be sampled at a relatively long time period or a large number of frames.

When a load of the device is excessively large on the basis of an amount of computation related to the event detection of the device, for example, when the number of video streams for which event detection needs to be confirmed is temporarily increased, the device may control the computational load in a method of setting the sampling condition to sample the frames at every short time period or a small number of frames.

Referring to FIG. 4 again, in operation 430, on the basis of the detection of the event in operation 420, the device may restrict provision of the video stream from the first device which is the video provider device corresponding to the video stream in which the event is detected.

For example, when it is determined that the event is detected, the device according to an example embodiment may directly restrict streaming transmission of the video stream from the first device. According to an example embodiment, when the event is detected, the device may block the user corresponding to a source stream in which the event is detected from performing a broadcast for a set time, restrict all streaming of other source streams previously generated by the user (regardless of the broadcast ID information of each streaming), or interrupt an event detection operation on the source stream generated by the user for a specified period of time.

Meanwhile, on the basis of a probability value related to the event detection acquired by the device (for example, a learning model trained through machine learning stored in the device), when the probability value is less than a specified threshold value, a device according to another example embodiment may transmit information related to the video stream corresponding to the event to a second device, for example, a monitoring agent device (for example, the second electronic device 110b of FIG. 2), instead of the device restricting streaming transmission directly from the first device in order to additionally reconfirm whether the event is detected. In selected embodiments, the device may directly transmit the information related to the video stream corresponding to the event to the monitoring agent device or indirectly transmit the information (the information related to the video stream) to the monitoring agent device through an API server (for example, the API server 120a of FIG. 2). In certain embodiments, the second device may include one or more external devices, and the number of the one or more external devices may be determined on the basis of a magnitude of the probability value related to the event detection. In many embodiments, when the probability value (for example, a probability value related to reliability of the event detection) is greater than or equal to a first threshold value (for example, 0.8) and is less than a second threshold value (for example, 0.95), the device may transmit the information to one external device (for example, a first monitoring agent device) and receive result information related to the event detection, thereby reconfirming whether the event is detected. In several embodiments, when the probability value is less than the first threshold value (for example, 0.8), or is greater than or equal to a third threshold value (for example, 0.3) but less than the first threshold value (for example, 0.8), the device may transmit the information to two different external devices (for example, the first monitoring agent device and a second monitoring agent device) and receive the result information related to the event detection from each of the two different external devices, thereby reconfirming whether the event is detected. In certain embodiments, when the probability value is less than the third threshold, the device may transmit the information to three or more external devices to reconfirm whether the event is detected three or more times or may ignore data related to the event detection corresponding to the probability value.

In many embodiments, as information related to the video stream corresponding to the event, the device may transmit at least one among time stamp information corresponding to the event, frame information corresponding to the event, user ID information corresponding to the first device, and broadcast ID information related to the video stream (for example, stream ID information (stream ID) and/or broadcast ID information (broadcast ID)) to the second device. In an example, as the frame information corresponding to the event, the device may transmit a frame in which the event is detected and frame(s) immediately before the frame (and frame(s) immediately after the frame).

Accordingly, the second device may receive user (administrator) input information on whether an event is detected in the video stream and confirm whether an actual event corresponds to an event detection case in which the probability value is less than a specified threshold value through the user (administrator) input information. In addition, the device may additionally train the learning model on the basis of reconfirmation result information related to the event detection received from the second device.

Meanwhile, according to various example embodiments of the present disclosure, in designating a threshold value to be compared with the probability value, when the existing event detection history of a user (video provider) corresponding to the first device is present on the basis of the user ID information corresponding to the first device, the device may identify whether an event occurs in the video stream on the basis of a based on stricter standards by designating the threshold as a relatively large value.

According to various example embodiments, it is possible to automatically identify whether harmful elements are included in a video transmitted in a real-time streaming method using at least one model (for example, a learning model trained through machine learning) in an efficient manner and restrict streaming transmission related to the video, thereby providing a wholesome service environment related to a real-time personal broadcast or a multi-party video call.

It is noted that effects of the present disclosure are not limited to the above-described effect, and other effects of the present disclosure will be apparent to those skilled in the art from the appended claims.

Meanwhile, in the present specification and the accompanying drawings, although the example embodiments of the present disclosure have been disclosed and specific terms have been used, these are merely used in a general sense to easily describe the technical content of the present disclosure and help understanding of the present disclosure, and it is not intended to limit the scope of the present disclosure. In addition to the example embodiments disclosed herein, it is obvious to those skilled in the art to which the present disclosure pertains that other modifications may be implemented on the basis of the technical spirit of the present disclosure.

Meanwhile, in the present specification and the accompanying drawings, although the example embodiments of the present disclosure have been disclosed and specific terms have been used, these are merely used in a general sense to easily describe the technical content of the present disclosure and help understanding of the present disclosure, and it is not intended to limit the scope of the present disclosure. It is obvious to those skilled in the art to which the present disclosure pertains that other modifications may be implemented on the basis of the technical spirit of the present disclosure.

The electronic device or server according to the above-described example embodiments may include a processor, a memory for storing and executing program data, a permanent storage such as a disk drive, a communication port for communicating with an external device, and user interface devices such as touch panels, keys, and buttons. Methods implemented as software modules or algorithms may be computer-readable codes or program instructions executable on the processor and be stored on a computer-readable recording medium. Here, the computer-readable recording medium includes a magnetic storage medium (for example, a read-only memory (ROM), a random-access memory (RAM), a floppy disk, and a hard disk) and an optically readable medium (for example, a compact disc (CD)-ROM and a digital versatile disc (DVD)). The computer-readable recording medium may also be distributed in a computer system connected via a network so that a computer-readable program or code can be stored and executed in a distributed manner. The computer-readable recording medium may be readable by a computer, stored in a memory, and executed by a processor.

The example embodiments may be represented by functional block components and various processing operations. These functional blocks may be implemented in various numbers of hardware and/or software configurations which perform specific functions. For example, the example embodiments may employ integrated circuit components, such as a memory, processing, a logic, a look-up table, capable of executing various functions under the control of one or more microprocessors or other control devices. Similar that the components may be implemented as software programming or software components, the example embodiments may include various algorithms implemented in a combination of data structures, processes, routines, or other programming components and may be implemented in a programming or scripting language such as C, C++, Java, or an assembler. The functional aspects may be implemented with algorithms running on one or more processors. In addition, the example embodiments may employ the related art for an electronic environment setting, signal processing, and/or data processing. Terms such as "mechanism," "element," "part," and "component" may be used broadly and are not limited to mechanical and physical components. These terms may include the meaning of a series of routines of software in association with a processor or the like.

The above-described example embodiments are merely examples, and other example embodiments may be implemented within the scope of the appended claims which will be described below.

What is claimed is:

1. A method of providing a video stream based on machine learning in an electronic device, the method comprising:
receiving a source video stream which is streamed from a first device to at least one other device;
acquiring a probability value related to whether an event is detected on the source video stream using a learning model trained through machine learning on the basis of at least one frame of the source video stream;
determining whether to restrict streaming of the source video stream from the first device on the basis of the probability value,
wherein the determining of whether to restrict the streaming comprises:
when the probability value is less than a specified threshold value, transmitting, to one or more external monitoring devices, a reconfirmation request for event detection, wherein the reconfirmation request comprises information related to a video stream corresponding to the event; and
determining whether to restrict the streaming of the source video stream based on responses to the reconfirmation request acquired from the one or more external monitoring devices; and
training the learning model on the basis of the responses acquired from the one or more external monitoring devices.

2. The method of claim 1, wherein the determining of whether to restrict the streaming includes, when the probability value is greater than or equal to the specified threshold value, restricting the streaming of the source video stream in response to the acquisition of the probability value.

3. The method of claim 1, further comprising:
when the probability value is greater than or equal to the specified threshold value, interrupting, for a specified time, determination of whether the event is detected on the source video stream from the first device.

4. The method of claim 1, wherein the number of the one or more external monitoring devices, which is to transmit the information related to the video stream, is determined on the basis of a magnitude of the probability value.

5. The method of claim 1, wherein the specified threshold value is determined on the basis of a user identification (ID) information corresponding to the first device.

6. The method of claim 1, wherein the transmitting of the information includes:
when the probability value is greater than or equal to a first threshold value and is less than a second threshold value, transmitting the information related to the video stream corresponding to the event to a first external monitoring device; and
when the probability value is less than the first threshold value, transmitting the information related to the video stream corresponding to the event to the first external monitoring device and a second external monitoring device,
wherein the determining of whether to restrict the streaming includes, when the probability value is equal to or greater than the second threshold value, restricting the streaming of the source video stream in response to the acquisition of the probability value.

7. The method of claim 1, wherein the information related to the video stream includes a first frame information corresponding to the event detection, at least one piece of second frame information before the first frame corresponding to the event detection, and at least one piece of third frame after the first frame corresponding to the event detection.

8. An electronic device, comprising:
a communication module;
a database; and
a processor,
wherein the processor is set to receive a source video stream which is streamed from a first device to at least one other device, acquire a probability value related to whether an event is detected on the source video stream using a learning model trained through machine learning on the basis of at least one frame of the source video stream, determine whether to restrict streaming of the source video stream from the first device on the basis of the probability value,
wherein the processor determines whether to restrict the streaming by:
when the probability value is less than a specified threshold value, transmitting, to one or more external monitoring devices, a reconfirmation request for event detection, wherein the reconfirmation request comprises information related to a video stream corresponding to the event; and
determining whether to restrict the streaming of the source video stream based on responses to the reconfirmation request acquired from the one or more external monitoring devices; and
training the learning model on the basis of the responses acquired from the one or more external monitoring devices.

9. The electronic device of claim 8, wherein the processor:
transmits the information related to the video stream corresponding to the event to a first external monitoring device when the probability value is greater than or equal to a first threshold value and is less than a second threshold value;
transmits the information related to the video stream corresponding to the event to a plurality of external monitoring devices including the first external monitoring device when the probability value is less than the first threshold value; and
restrict the streaming of the source video stream in response to the acquisition of the probability value when the probability value is greater than or equal to a second threshold value.

10. A computer-readable non-transitory recording medium for recording a program for executing a method of providing a video stream based on machine learning on an electronic device,
wherein the method of providing a video stream based on machine learning includes:
receiving a source video stream which is streamed from a first device to at least one other device;
acquiring a probability value related to whether an event is detected on the source video stream using a learning model trained through machine learning on the basis of at least one frame of the source video stream;
determining whether to restrict streaming of the source video stream from the first device on the basis of the probability value,
wherein the determining of whether to restrict the streaming comprises:
when the probability value is less than a specified threshold value, transmitting, to one or more external monitoring devices, a reconfirmation request for event detection, wherein the reconfirmation request comprises information related to a video stream corresponding to the event; and
determining whether to restrict the streaming of the source video stream based on responses to the reconfirmation request acquired from the one or more external monitoring devices; and
training the learning model on the basis of the responses acquired from the one or more external monitoring devices.

* * * * *